United States Patent
Guadagno

(10) Patent No.: US 8,662,583 B2
(45) Date of Patent: Mar. 4, 2014

(54) VEHICLE SEAT TRIM ATTACHMENT

(75) Inventor: Leonardino Guadagno, Nichelino (IT)

(73) Assignee: Lear Corporation, Southfield, MI (US)

( * ) Notice: Subject to any disclaimer, the term of this patent is extended or adjusted under 35 U.S.C. 154(b) by 252 days.

(21) Appl. No.: 13/012,173

(22) Filed: Jan. 24, 2011

(65) Prior Publication Data

US 2012/0187731 A1 Jul. 26, 2012

(51) Int. Cl.
*A47C 31/00* (2006.01)
(52) U.S. Cl.
USPC ..................... 297/218.2; 297/218.1
(58) Field of Classification Search
USPC ........................... 297/218.1, 218.2
See application file for complete search history.

(56) References Cited

U.S. PATENT DOCUMENTS

| | | | |
|---|---|---|---|
| 5,005,242 A * | 4/1991 | Kennedy et al. | 24/444 |
| 5,236,243 A * | 8/1993 | Reyes | 297/219.1 |
| 5,302,001 A | 4/1994 | van Dis | |
| 5,326,151 A | 7/1994 | Smith et al. | |
| 5,338,386 A | 8/1994 | Frelich et al. | |
| 5,711,169 A | 1/1998 | Leeke et al. | |
| 6,120,630 A | 9/2000 | Lorbiecki | |
| 6,612,648 B1 * | 9/2003 | Hashiguchi | 297/218.1 |
| 6,899,399 B2 | 5/2005 | Ali et al. | |
| 7,077,473 B2 * | 7/2006 | Demain et al. | 297/228.13 |
| 7,487,575 B2 * | 2/2009 | Smith | 24/297 |
| 7,488,527 B2 | 2/2009 | Herrero et al. | |
| 7,699,396 B2 | 4/2010 | Ghisoni et al. | |
| 2009/0033131 A1 | 2/2009 | Clauser et al. | |
| 2009/0300890 A1 | 12/2009 | Coronel et al. | |
| 2010/0117434 A1 | 5/2010 | Galbreath et al. | |

* cited by examiner

*Primary Examiner* — Philip Gabler
(74) *Attorney, Agent, or Firm* — Brooks Kushman P.C.

(57) ABSTRACT

In at least one embodiment a trim cover assembly has an attachment feature for securing the trim cover to the foam cushion of a vehicle seat. The attachment feature is formed of a strip of touch-fastener material having a first side and a second side disposed adjacent a pair of trim panels. Stitching joins the first side, the second side and the trim panels to each other to form a seam in the trim cover between the pair of trim panels in order to form the attachment feature with the touch-fastener material.

20 Claims, 2 Drawing Sheets

VEHICLE SEAT TRIM ATTACHMENT

TECHNICAL FIELD

This invention relates in general to a trim attachment assembly and method of attaching a trim cover to a seat cushion

BACKGROUND

Vehicle seats generally include a seat back and a seat cushion or bottom. The seat back is commonly pivotally attached to the seat bottom. Each of the seat back and the seat bottom typically includes a framework, a cushion or padding connected to the framework, and a trim cover for decoratively covering and protecting the cushion. Typically, the cushion is made of an expandable foam material and is molded to a desired shape. Suitable examples of some trim cover materials include leather, polymers, and fabric. Often times, the trim cover is provided with a thin layer of padding, such as foam.

Various seat trim attachment assemblies are commonly used in the industry. One such type of attachment assembly is often referred to as a close out attachment wherein the attachment assembly is generally not readily visible and is commonly located along the underside of the seat back or bottom. Another type of attachment is referred to as a trench attachment wherein the attachment area is readily visible by the vehicle occupants. In this situation, such as in bucket-style seats, the trench attachment is employed along the areas where the raised bolsters meet the recessed central seating and back sections, thereby creating a valley or trench where the trim material is secured to avoid the appearance of loose fitting trim material. The trench is often located at seam lines, and thus the seam is drawn slightly into the foam cushion of the seat.

SUMMARY

In at least one embodiment a trim cover assembly having an attachment feature for securing the trim cover to the foam cushion of a vehicle seat is provided. The attachment feature is formed of a strip of touch-fastener material having a first side and a second side, the strip of touch-fastener material disposed adjacent a pair of trim panels. Stitching joins the first side, the second side and the trim panels to each other to form a seam in the trim cover between the pair of trim panels in order to form the attachment feature with the touch-fastener material. In another embodiment the touch-fastener material forms a loop that covers the edges of each trim panel, without an intermediate seam. In a further embodiment, the touch-fastener material includes at least one verification feature for verifying the pair of trim panels and the strip of touch-fastener material are aligned prior to securing the pair of trim panels and the first and second sides of the touch-fastener.

In at least one embodiment a method for forming a trim cover assembly having an attachment feature for securing the trim cover over the foam cushion of a vehicle seat is provided. The method includes providing a pair of trim panels and a strip of touch-fastener material having a first side and a second side. The pair of trim panels are oriented so that a portion of the pair trim panels are adjacent. The strip of touch-fastener material is oriented so that the first side and the second sides are adjacent the pair trim panels. The first side, the second side and the trim panels are joined to each other to form a seam in the trim cover between the pair of trim panels in order to form an attachment feature with the touch-fastener material.

In at least one embodiment, a vehicle seat assembly is provided. The vehicle seat assembly includes a foam cushion having at least one trench formed in the foam cushion and a touch-fastener material disposed in the trench. The vehicle seat assembly also includes a trim cover with a pair of trim panels and having an attachment feature for securing the trim cover over to the foam cushion. The attachment feature includes a strip of mating touch-fastener material having a first side and a second side. The strip of mating touch-fastener material is disposed adjacent the pair of trim panels. Stitching joins the first side, the second side and the trim panels to each other. The trim cover is secured to the foam cushion when the attachment feature is aligned with the trench so that the touch-fastener material retains the mating touch-fastener material.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except for otherwise expressly indicated, all numeral quantities in this description and in the claims indicating amounts or conditions are to be understood as modified by the word "about" in describing the broader scope of the invention. Practice within the numerical range as stated is generally preferred. Also, unless expressly stated to the contrary, percents, "parts of," and ratio values are by weight and the description of a group or class of materials as suitable or preferred for a given purpose in connection with the invention implies that mixtures of any two or more members of the group or class may be equally suitable and preferred.

Figure 1:
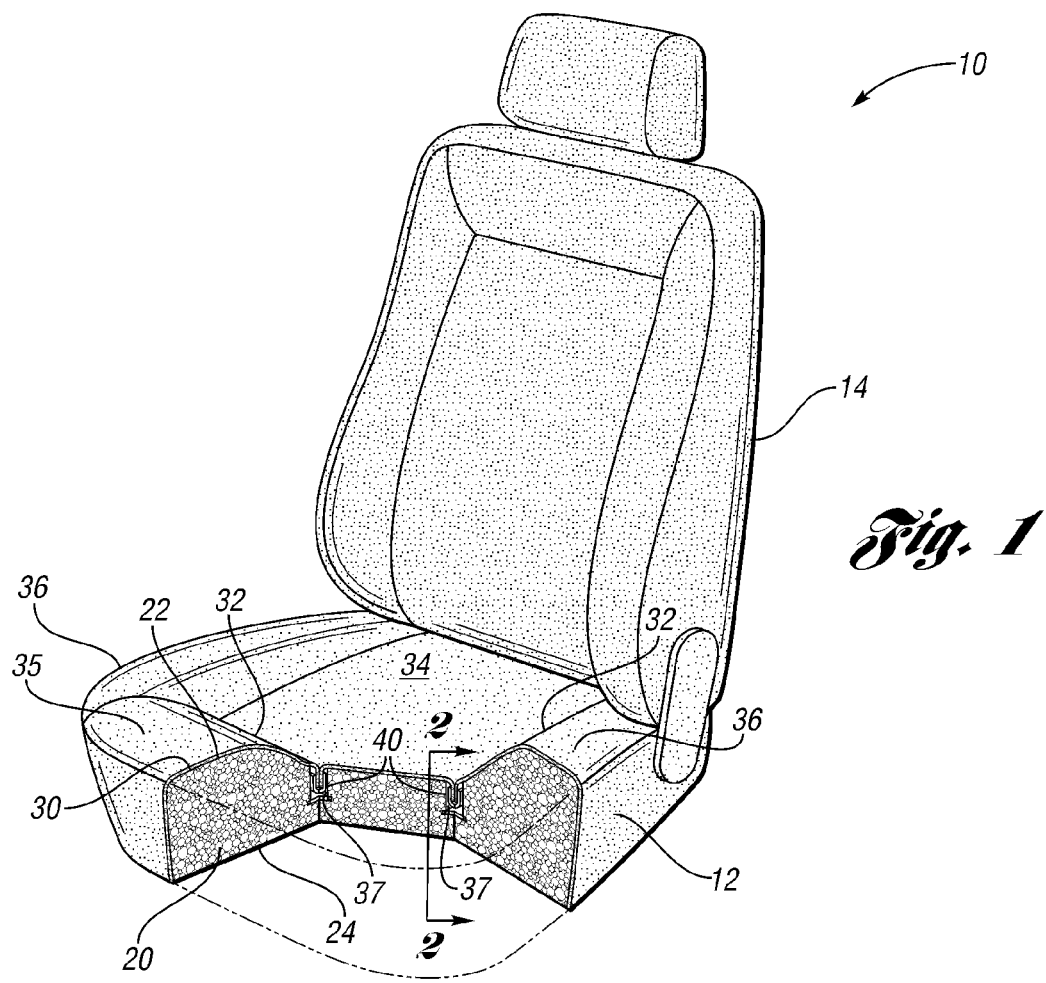
FIG. 1 is a perspective view of the seat assembly utilizing a trim attachment assembly, schematically shown, in accordance with at least one embodiment of the present invention.

Referring now to the drawings, there is illustrated in FIG. 1 an exemplary seat, indicated generally at 10. The seat 10 generally includes a seat bottom 12 and a seat back 14. The seat 10 is shown having a bucket type configuration but it should be understood that the seat 10 can have any desired structure and/or appearance. The seat bottom 12 and the seat back 14 may be made in a similar manner and for ease of description, only the formation of the seat bottom 12 will be described in detail below but is should be understood that the same may be used in assembling the seat back 14.

In at least one embodiment, the seat bottom 14 includes a framework (not shown) for supporting a foam cushion 20. The cushion 20 is preferably made of a foam material, such as an expandable polymer. The cushion 20 has a first or upper surface 22 facing upwards and acting as a seating surface for an occupant, and a second or lower surface 24 facing downward towards the floor the vehicle in which the seat 10 is installed.

The upper surface 22 of the seat bottom 14 are covered by a flexible trim cover 30. The trim cover 30 can be any suitable material for covering and protecting the upper surface 22. Examples of suitable material for the trim cover 30 include leather, vinyl or other polymers, cloth, and/or fabric. The trim cover 30 may have a layer of foam along its underside. The trim cover 30 may be provided in separate panels which are sewn together to define seams 32 therebetween.

In the embodiment shown in FIG. 1, the trim cover 30 may include a central panel 34, a front panel 35, and side bolster panels 36 defined by seams 32 therebetween. As will be explained in detail below, at least one, and typically a plurality of trim attachment features, schematically shown as 40 in FIG. 1, are used to attach the trim cover 30 to the cushion 20. The trim attachment feature 40 functions to slightly draw the seams 32 inwardly into the cushion 20 to while securing the trim cover 30 to the cushion 20 in order provide a pleasant overall appearance of the vehicle seat 10.

Figure 2:
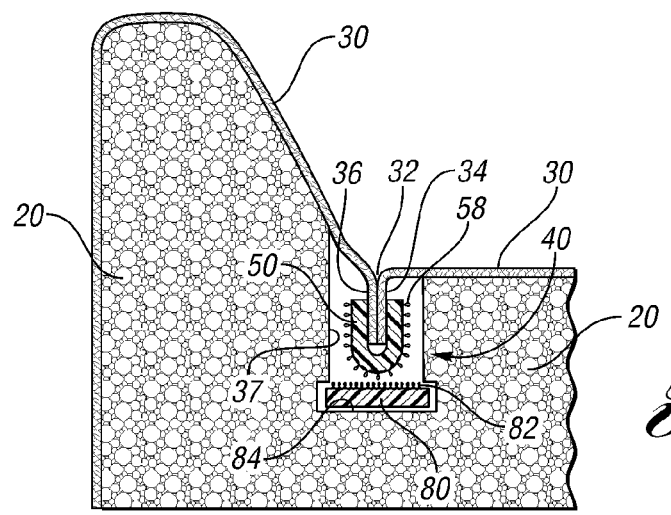
FIG. 2 is a sectional view taken along the line 2-2 of FIG. 1 illustrating an embodiment of a trim attachment assembly

The cushion 20 may include at least one opening 37. The opening 37 may be a recess, an elongated channel or a trench formed in the cushion 20 such that the seams 32 may be inserted therein. For clarity, as shown in FIG. 2, the width of the trenches 37 are shown enlarged but it should be understood that the trenches 37 may be much smaller and may be simply spread apart when needed since the cushion 20 is preferably made of a flexible foam material capable of such deformation. The trenches 37 may not extend through the cushion 20. The trench 37 may be integrally formed in the cushion 20, such as by molding. However, the trench 37 may also be formed between multiple cushion 20 portions or layers.

Referring now to FIG. 2, a cross-sectional view of a trim attachment feature 40 is illustrated. The trim attachment feature 40 is adapted to secure the trim cover 30 to the foam cushion 20 of the vehicle seat 10. According to one embodiment of the invention, the trim attachment feature 40 is formed with a pair of trim panels, such as a central panel 34 and a bolster panel 36 as shown in section 2-2 in FIG. 1. The pair of trim panels 34, 36 and a strip of touch-fastener material 50 are stitched to form a seam 32 in the trim cover 30 in order to form the trim attachment feature 40 with the touch-fastener material 50. It is contemplated that the trim attachment feature 40 may be formed with any pair of trim panels, such between the front panel 35 and central panel 34, or any other combination of adjacent trim panels. Further, while the trim panels 34, 35, 36 may be separate panels which are secured together, the trim panels 34, 35, 36 may also be integrally formed, such as in a single piece of material that forms the trim cover 30.

Figure 3:
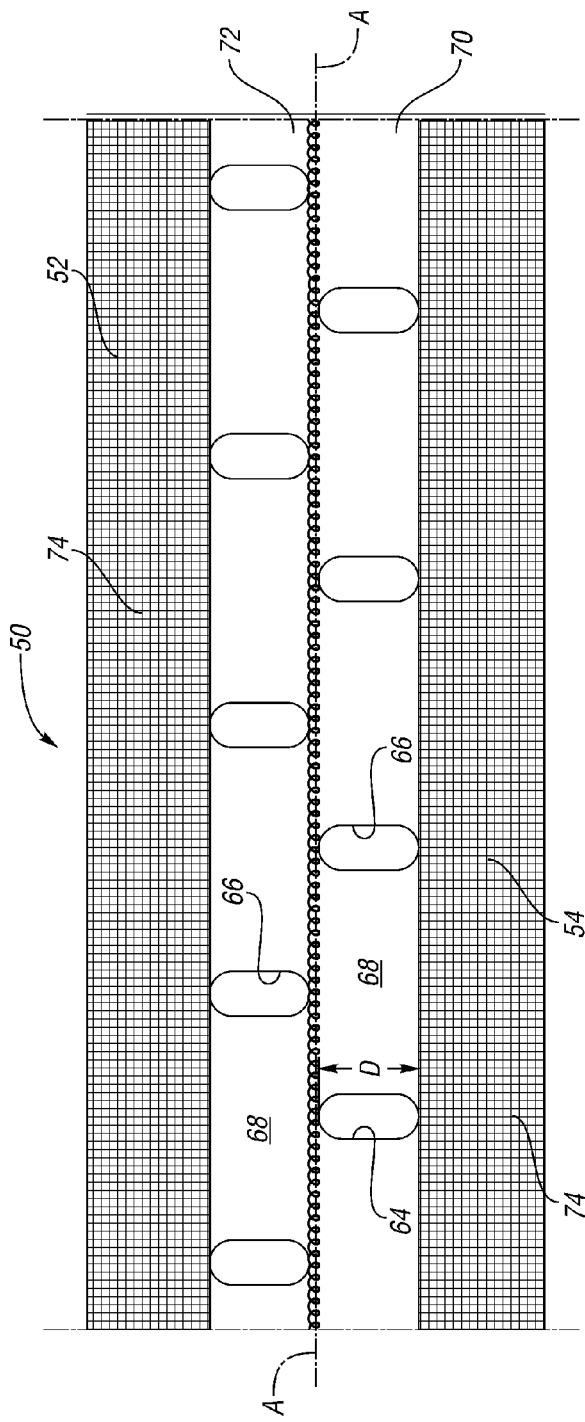
FIG. 3 is a plan view of a component of the trim attachment assembly in accordance with at least one embodiment of the present invention.
Figure 4:
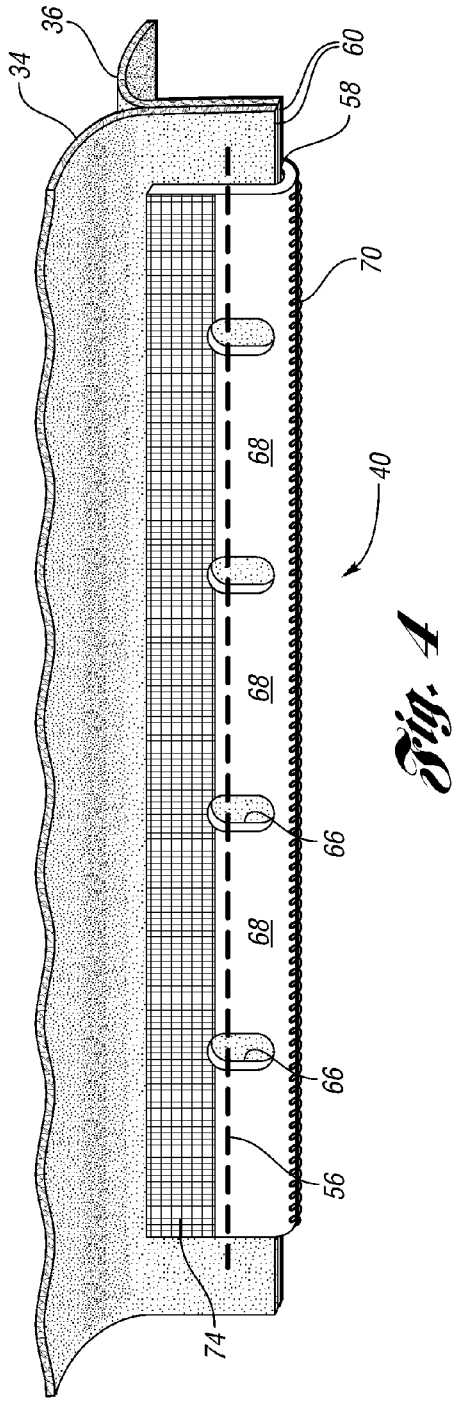
FIG. 4 is a perspective view of a trim attachment assembly made in accordance with at least one embodiment of the present invention.

Referring now to FIG. 3, a strip of touch fastener material 50 according to one embodiment of the invention is illustrated. Preferably, the strip of touch fastener 50 may be formed of material such as hook-and-loop material such as Velcor®. It is also contemplated that the touch fastener 50 may also be formed of Dual Lock® or any other suitable touch-fastener material that is easily joined to a mating fastener with application of low pressure or force. The touch-fastener generally requires a greater amount of force to be unfastened. However, once unfastened, touch fastener material may be reclosable, since the touch fastener material is reusable. The strip of touch fastener material 50 may have a first side 52 and a second side 54 opposite the first side 52.

The trim attachment feature 40 is formed when the strip of touch-fastener material 50 is folded and so that the first side 52 and second side 54 are disposed adjacent the pair of trim panels 34, 36. The first side 52, the second side 54 and the pair of trim panels 34, 36 are joined with stitching 56. The stitching 56 goes through all four layers of the first and second sides 52, 54 of the touch fastener material 50 and the pair of trim panels 34, 36.

In one embodiment of the invention, the first side 52 of the touch-fastener material 50 is disposed directly adjacent one of the pair trim panels 34, 36 and the second side 54 of the touch-fastener material 50 is disposed directly to the other of the pair of trim panels 34, 36 so that the touch-fastener material 50 forms a loop 58 that covers an edge 60 of each of the trim panel 34, 36, without an intermediate seam. The pair of trim panels 34, 36 may be aligned along at along at least one edge 60 of each of the trim panels 34, 36. It is also contemplated that the first side 52 and second side 54 are located directly adjacent each other and secured to one of the trim panels so that the loop 58 does not cover the edge 60 of the trim panels 34, 36.

Prior art methods of attaching a trim attachment feature to the trim panels require an intermediate seam. The intermediate seam may be required only to secure the pair of trim panels together so that the stitching is ensured to be an adequate distance from the edge of the trim panels so that the seam does not rip from stresses or stretching of the trim panel material. In this case, an additional operation is required to stitch the touch-fastener material to the trim cover. The additional operation may be a costly process.

As illustrated in FIG. 3, one embodiment of the touch-fastener material 50 includes at least one verification feature 64. The verification feature 64 is used to verify the pair of trim panels 34, 36 and the strip of touch-fastener material 50 are oriented and aligned while securing the pair of trim panels 34, 36 to the touch-fastener 50. By including the verification feature 64 in the touch fastener material 50, the four layers of the pair of trim panels 34, 36 and the first and second sides 52, 54 of the touch fastener material 50 can be joined without an intermediate seam or additional operation or fastening mechanism such as adhesive or tacking, to align the pair of trim panels 34, 36.

In one embodiment of the invention, the verification feature 64 may be an eyelet opening 66 formed along the strip of touch-fastener material 50. As illustrated, the eyelet opening 66 may be a generally oval or elliptical shaped opening, although any suitable shape is contemplated. For example, depending on the technology, needs and feasibility, the shape of the opening 66 can be rhombus, squared, rectangular, or formed in whatever shape and method is suitable.

The eyelet 66 may oriented so that the major axis of the eyelet 66 is perpendicular to the centerline A along the length of the strip of touch fastener material 50. The eyelet 66 may be sized to have a diameter D of at least eight millimeters along the major axis in order to verify the stitching 56 is at least eight millimeters from the edge 60 of the pair of trim panels 34, 36. Alternatively, the eyelet 66 may have a diameter D ranging from eight millimeters to twelve millimeters so that the stitching 56 may extend through the eyelet opening 66. For example, seams could be made at least from six millimeters to ten millimeters from the edge 60 of the trim panels 34, 36 and the eyelet opening may be sized similarly.

A plurality of eyelet openings 66 may be formed along the each of the first and second sides 52, 54 of the strip of touch fastener material 50. The plurality of eyelet openings 66 may be formed at alternating or offset positions along the first side 52 and the second side 54 to avoid weakening the strip of touch fastener material 50. In this configuration, the alignment of the trim panels 34, 36 may be verified along either the first side 52, or the second side 54. Further, the strength of the touch fastener material 50 is not compromised when the eyelets 66 are located at alternating positions between the first side 52 and the second side 54 since an area 68 of touch fastener material is maintained. Alternatively, the eyelet opening 66 may be formed along only one side 52 of the touch fastener material 50 where verification is only required on one side 52.

The plurality of eyelet openings 66 may be formed at alternating positions from a center line A of the strip of touch fastener material 50. The eyelet openings 66 may extend generally from the center line A. The strip of touch fastener material 50 may be formed with a portion of loop fastener 70 formed along a central portion 72 of the strip of touch fastener 50. Tape fabric 74 is the support material on which the loop fastener 70 is formed. Loop fastener 70 may cover the whole tape fabric surface 74. Or, as illustrated in FIG. 3, a portion of tape fabric 74 may be extend on either side of the loop material 58 along the first side 52 and second side 54. The tape fabric 74 may not include loop fastener but may generally provide additional strength to the strip of touch fastener material 50. The diameter of the eyelet opening 66 may be sized so the diameter D is that less than half the width of the central portion 72 and extends generally from the center line A to the tape fabric 74.

The verification feature 64 may be formed by punching the eyelet opening 66 along the strip of touch-fastener material 50. Alternatively, the eyelet opening 66 may be formed with a die-cut process or any other suitable rework operation. The eyelets 66 may also be directly formed in the strip of touch fastener material 50 when the material is woven.

Referring back to FIG. 2, a mating touch-fastener material 80 is disposed in the seat cushion 20. For example, where the touch fastener material 50 is hook-and-loop material, the mating touch fastener 80 may be hook material 82 which securely fastens to the loop material 68 on the trim attachment feature 40.

The mating touch-fastener material 80 may be located along a bottom surface 84 of the trench 37. As illustrated in FIG. 2, the mating touch-fastener material 80 is hook material 82. The hook material 82 may be molded in the foam cushion 20. Alternatively, the hook material 82 may be secured between two cushion 20 layers with conventional means such as adhesive or tacking.

The strip of touch fastener material 50 may extend along the entire seam 32. Likewise, the mating touch fastener 80 may extend along the entire trench 37. It is also contemplated that the strip of touch fastener material 50 may extend only along a portion of the seam 32 and the mating touch fastener 80 may only extend along a corresponding portion of the trench 37. It is also contemplated that the touch faster material 50 and the mating touch fastener 80 may not have the same length. For example, the loop fastener 70 may run along the whole seam 32 while the hook fastener 82 is placed only in one portion of the trench 37 of the foam 20.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for forming a trim cover assembly having an attachment feature for securing the trim cover over a cushion of a vehicle seat, the method comprising:

providing a pair of trim panels;
providing a strip of touch-fastener material having a first side and a second side;
orienting the pair of trim panels so that a portion of the pair trim panels are adjacent;
orienting the strip of touch-fastener material so that the first side and the second sides are adjacent the pair trim panels;
forming at least one verification feature at least one of the first and second side of the touch-fastener material;
joining the first side, the second side of the touch-fastener material and the trim panels to each other with one seam in the trim cover between the pair of trim panels in order to form an attachment feature with the touch-fastener material, without an intermediate seam joining the pair of trim panels adjacent to the strip of touch-fastener material; and
verifying via the verification feature that the one seam is positioned a minimum distance from an edge of the pair of trim panels.

2. The method for forming a trim cover assembly according to claim 1 wherein stitching goes through the pair of trim panels, the first side and the second side when the pair of trim panels, the first side and the second side are joined.

3. The method for forming a trim cover assembly according to claim 1 wherein the pair of trim panels are aligned along at least one edge of each of the trim panels.

4. The method for forming a trim cover assembly according to claim 1 wherein the first side of the touch-fastener material is disposed along one of the pair of trim panels and the second side of the touch-fastener material is disposed along the other of the pair of trim panels such that the touch-fastener material forms a loop that covers the edges of each of the trim panel.

5. The method for forming a trim cover assembly according to claim 1 verifying the pair of trim panels and the strip of touch-fastener material are aligned the minimum distance prior to joining the pair of trim panels and the first and second sides of the touch-fastener material without the intermediate seam.

6. The method for forming a trim cover assembly according to claim 1 wherein the one seam extends through the pair of trim panels and the strip of touch-fastener material.

7. The method for forming a trim cover assembly according to claim 1 wherein the verification feature includes an eyelet opening, wherein the verification feature is formed by punching the eyelet opening along the touch-fastener material.

8. The method for forming a trim cover assembly according to claim 1 wherein the verification feature includes an eyelet opening, wherein the verification feature is formed by weaving the eyelet opening along the touch-fastener material.

9. A trim cover assembly having an attachment feature for securing the trim cover assembly to a cushion of a vehicle seat, the trim cover assembly comprising:

a pair of trim panels;
a strip of touch-fastener material having a first side and a second side, the strip of touch-fastener material disposed adjacent the pair of trim panels;
stitching joining the first and second side of the touch-fastener material and the trim panels to each other with only one seam in order to form an attachment feature with the touch-fastener material; and
at least one verification feature formed in at least one of the first and second side of the touch-fastener material,
wherein the verification feature ensures the one seam is stitched a minimum distance from an edge of the pair of trim panels while joining the touch-fastener material to the pair of trim panels without an intermediate seam stitched in the pair of trim panels adjacent the touch-fastener material.

10. The trim cover assembly according to claim 9 wherein the first side of the touch-fastener material is disposed along one of the pair of trim panels and the second side of the touch-fastener material is disposed along the other of the pair of trim panels such that the touch-fastener material forms a loop that covers the edges of each of the trim panel.

11. The trim cover assembly according to claim 9 wherein the first side of the touch-fastener material is disposed directly adjacent one of the pair of trim panels and the second side of the touch-fastener material is directly to the other of the pair of trim panels such that the touch-fastener material forms a loop of touch-fastener material that covers the edges of each of the trim panel, wherein the one seam extends through the touch-fastener material.

12. The trim cover assembly according to claim 9 wherein the one seam extends through the verification feature.

13. The trim cover assembly according to claim 12 wherein the verification feature is an eyelet opening formed along the strip of touch-fastener material.

14. The trim cover assembly according to claim 13 wherein the diameter of the eyelet opening is less than half the width of the touch-fastener material.

15. A trim cover assembly according to claim 13 wherein the touch-fastener material includes a plurality of eyelet openings along the strip of touch-fastener material.

16. A trim cover assembly according to claim 15 wherein the plurality of eyelet openings are formed in alternating locations along the first side and the second side of the touch-fastener material.

17. A trim cover assembly according to claim 9 wherein the cushion of the seat includes a trench in which a mating touch-fastener material is disposed so that the attachment feature engages the trench in the cushion and is secured to the mating touch-fastener material, thereby securing the trim cover to the cushion.

18. A vehicle seat assembly comprising:
a foam cushion having at least one trench formed in the foam cushion;
a first touch-fastener material disposed in the at least one trench;
a trim cover assembly including an attachment feature for securing the trim cover assembly over to the foam cushion, the attachment feature including:
a pair of trim panels;
a second mating touch-fastener material having a first side and a second side, the second mating touch-fastener material disposed adjacent the pair of trim panels; and
stitching joining the first side, the second side of the mating touch-fastener material and the trim panels to each other with only one seam,
wherein the first side of the mating touch-fastener material is disposed directly adjacent one of the pair trim panels and the second side of the mating touch-fastener material is directly to the other of the pair of trim panels such that the mating touch-fastener material forms a loop of touch-fastener material that covers the edges of each of the trim panels, without an intermediate seam; and
at least one verification feature formed in at least one of the first and second side of the touch-fastener material, wherein the verification feature ensures the only one seam is stitched a minimum distance from the edges of the pair of trim panels covered by the loop of the touch-fastener material,
wherein the trim cover assembly is secured to the foam cushion when the attachment feature is aligned with the at least one trench so that the first touch-fastener material retains the second mating touch-fastener material.

19. The vehicle seat assembly according to claim 18 wherein the first touch-fastener material is molded in the foam cushion.

20. The vehicle seat assembly according to claim 18 wherein the one seam extends through the verification feature.

* * * * *

UNITED STATES PATENT AND TRADEMARK OFFICE
CERTIFICATE OF CORRECTION

PATENT NO.         : 8,662,583 B2                                   Page 1 of 1
APPLICATION NO.    : 13/012173
DATED              : March 4, 2014
INVENTOR(S)        : Leonardino Guadagno It is certified that error appears in the above-identified patent and that said Letters Patent is hereby corrected as shown below:

In the Claims

Column 6, Lines 4-5, Claim 1:

Before "trim panels"
Insert -- of --.

Column 6, Line 7, Claim 1:

After "adjacent the pair"
Insert -- of --.

Column 6, Line 9, Claim 1:

After "one verification feature"
Insert -- in --.

Column 8, Lines 18, Claim 18:

After "adjacent the pair"
Insert -- of --.

Signed and Sealed this
Tenth Day of June, 2014

Michelle K. Lee
*Deputy Director of the United States Patent and Trademark Office*